(12) United States Patent
Zhu et al.

(10) Patent No.: US 10,026,293 B2
(45) Date of Patent: Jul. 17, 2018

(54) SCREEN PROTECTION METHOD AND APPARATUS, AND STORAGE MEDIUM

(71) Applicant: Xiaomi Inc., Beijing (CN)

(72) Inventors: Ruixian Zhu, Beijing (CN); Guangjian Wang, Beijing (CN); Yixing Zou, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/360,615

(22) Filed: Nov. 23, 2016

(65) Prior Publication Data
US 2017/0148301 A1 May 25, 2017

(30) Foreign Application Priority Data
Nov. 25, 2015 (CN) .......................... 2015 1 0834522

(51) Int. Cl.
G06F 3/147 (2006.01)
G01L 1/26 (2006.01)
G08B 21/18 (2006.01)

(52) U.S. Cl.
CPC .............. G08B 21/182 (2013.01); G01L 1/26 (2013.01); G06F 3/147 (2013.01)

(58) Field of Classification Search
CPC ......... G08B 21/182; G01L 1/26; G06F 3/147; G06F 3/0414; G06F 3/0416; G06F 3/044; G06F 3/0488; G06F 11/327; G06F 2203/04105
See application file for complete search history.

(56) References Cited

U.S. PATENT DOCUMENTS

| 2007/0075871 | A1 | 4/2007 | Huang et al. |
| 2010/0309146 | A1* | 12/2010 | Lee ....................... G06F 3/0412 345/173 |
| 2011/0063248 | A1* | 3/2011 | Yoon ..................... G06F 3/0485 345/174 |
| 2011/0148668 | A1 | 6/2011 | Li et al. |
| 2011/0248957 | A1 | 10/2011 | Park |

(Continued)

FOREIGN PATENT DOCUMENTS

| CN | 1921739 A | 2/2007 |
| CN | 102103451 A | 6/2011 |

(Continued)

OTHER PUBLICATIONS

International Search Report dated Aug. 24, 2016, in International Application No. PCT/CN2015/099613, filed Dec. 29, 2015.

(Continued)

*Primary Examiner* — Brian Wilson
(74) *Attorney, Agent, or Firm* — Oblon, McClelland, Maier & Neustadt, L.L.P.

(57) ABSTRACT

The present disclosure relates to a screen protection method, apparatus, and a storage medium. The method includes acquiring a pressure state based on external pressure that is being applied to the display screen, the pressure state including information on one or more force bearing points and pressure values at the force bearing points; determining whether the pressure state corresponds to a first pressure state; and generating an alert when the pressure state corresponds to the first pressure state.

8 Claims, 6 Drawing Sheets

(56) References Cited

U.S. PATENT DOCUMENTS

| | | | | |
|---|---|---|---|---|
| 2012/0105358 A1* | 5/2012 | Momeyer | ............ | G06F 3/0414 345/174 |
| 2014/0260550 A1 | 9/2014 | Kil et al. | | |
| 2014/0327643 A1 | 11/2014 | Sun et al. | | |

FOREIGN PATENT DOCUMENTS

| | | |
|---|---|---|
| CN | 103077105 A | 5/2013 |
| JP | 10-319852 A | 12/1998 |
| JP | 2003-188962 A | 7/2003 |
| JP | 2005-323011 A | 11/2005 |
| JP | 2010-128769 A | 6/2010 |
| JP | 2010-250468 A | 11/2010 |
| JP | 2010-262364 A | 11/2010 |
| JP | 2012-123695 A | 6/2012 |
| JP | 2013-117951 A | 6/2013 |
| JP | 2013-258478 A | 12/2013 |
| KR | 10-2014-0111865 A | 9/2014 |
| RU | 2 474 866 C2 | 2/2013 |
| RU | 2012 106 500 A | 8/2013 |
| TW | 1469031 B | 1/2015 |
| WO | WO 2011/101899 A1 | 8/2011 |

OTHER PUBLICATIONS

Extended European Search Report dated Apr. 12, 2017 in patent application No. 16199153.4.

Office Action dated Dec. 1, 2016 in Chinese Patent Application No. 201510834522.6 (with English translation).

Combined Office Action and Search Report dated Nov. 16, 2017 in Russian Patent Application No. 2016134774 (with English translation of categories of cited documents) citing documents AN-AO therein, 6 pages.

Office Action dated Jan. 9, 2018 in Japanese Patent Application No. 2016-522785.

* cited by examiner

SCREEN PROTECTION METHOD AND APPARATUS, AND STORAGE MEDIUM

CROSS-REFERENCE TO RELATED APPLICATIONS

This application is based upon and claims priority to Chinese Patent Application No. 201510834522.6, filed on Nov. 25, 2015, which is incorporated herein by reference in its entirety.

TECHNICAL FIELD

The present disclosure relates to the technical field of screen protection, and more particularly, to a screen protection method, apparatus, and a storage medium.

BACKGROUND ART

Smart devices with screens are playing a more and more important role in peoples' lives. However, due to its fragility, a screen will crack when it is subjected to an excessive pressure. As a result, a user's smart device cannot be used and the user is hindered from handling matters using the smart device, thus not only causing economic loss to the user but also wasting the user's time.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for protecting a display screen. The method includes acquiring a pressure state based on external pressure that is being applied to the display screen, the pressure state including information on one or more force bearing points and pressure values at the force bearing points; determining whether the pressure state corresponds to a first pressure state; and generating an alert when the pressure state corresponds to the first pressure state.

When determining whether the pressure state corresponds to the first pressure state, the method includes determining a pressure value standard according to a number of the force bearing points; determining whether at least one of the pressure values at the force bearing points is within the pressure value standard; and determining that the pressure state corresponds to the first pressure state when the at least one of the pressure values is within the pressure value standard.

When determining the pressure value standard, the method includes determining the pressure value standard as a first substandard when the number of the force bearing points is one; and determining the pressure value standard as a second substandard when the number of the force bearing points is greater than or equal to 4.

The first substandard includes the pressure value at the force bearing point being equal to or greater than a first predetermined pressure value. The second substandard includes at least one of (i) a pressure value at one or more of the force bearing points being greater than or equal to the first predetermined pressure value, and (ii) each of the pressure values at the four or more force bearing points being greater than or equal to a second predetermined pressure value.

The pressure state further includes a distance between force bearing points. When determining the pressure value standard according to the number of the force bearing points, the method includes determining the pressure value standard as a third substandard when the number of the force bearing points is greater than or equal to 2 and a distance between two of the force bearing points is less than a predetermined distance.

The pressure state includes a force bearing duration of a force bearing point. When determining the pressure value standard, the method includes determining the pressure value standard as a fourth substandard when there is at least one force bearing point and a force bearing duration of the force bearing point is greater than a predetermined duration.

When generating the alert, the method includes at least one of highlighting a force bearing point on the display screen; and outputting alarm information identifying a position of the force bearing point on the display screen, wherein the alarm information includes at least one of text information and voice information.

Aspects of the disclosure also provide an apparatus including a display screen, a processor, and a memory for storing instructions executable by the processor. The processor is configured to acquire a pressure state based on external pressure that is being applied to the display careen, the pressure state including information on one or more force bearing points and pressure values at the force bearing points; determine whether the pressure state corresponds to a first pressure state; and generate an alert when the pressure state corresponds to the first pressure state.

The processor is further configured to determine a pressure value standard according to a number of the force bearing points; determine whether at least one of the pressure values at the force bearing points is within the pressure value standard; and determine that the pressure state corresponds to the first pressure state when the at least one of the pressure values is within the pressure value standard.

The processor is further configured to determine the pressure value standard as a first substandard when the number of the force bearing points is one; and determine the pressure value standard as a second substandard when the number of the force bearing points is greater than or equal to 4.

The first substandard includes the pressure value at the force bearing point being equal to or greater than a first predetermined pressure value. The second substandard includes at least one of (i) a pressure value at one or more of the force bearing points being greater than or equal to the first predetermined pressure value, and (ii) each of the pressure values at the four or more force bearing points being greater than or equal to a second predetermined pressure value.

The pressure state further includes a distance between force bearing points. The processor is further configured to determine the pressure value standard as a third substandard when the number of the force bearing points is greater than or equal to 2 and a distance between two of the force bearing points is less than a predetermined distance.

The pressure state further includes a force bearing duration of a force bearing point. The processor is further configured to determine the pressure value standard as a fourth substandard when there is at least one force bearing point and a force bearing duration of the force bearing point is greater than a predetermined duration.

The processor is further configured to highlight a force bearing point on the display screen; and output alarm information identifying a position of the force bearing point on the display screen, wherein the alarm information includes at least one of text information and voice information.

Aspects of the disclosure also provide a non-transitory computer-readable storage medium having stored therein instructions that, when executed by a processor, causes the processor to perform a method. The method includes acquiring a pressure state based on external pressure that is being applied to a display screen, the pressure state including information on one or more force bearing points and pressure values at the force bearing points; determining whether the pressure state corresponds to a first pressure state; and generating an alert when the pressure state corresponds to the first pressure state.

It is to be understood that both the foregoing general description and the following detailed description are illustrative and explanatory only and are not restrictive of the present disclosure.

BRIEF DESCRIPTION OF THE DRAWINGS

The accompanying drawings herein, which are incorporated into and constitute a part of the specification, illustrate aspects consistent with the present disclosure, and together with the specification, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the present disclosure. Instead, they are merely examples of apparatuses and methods consistent with aspects related to the present disclosure as recited in the appended claims.

Figure 1:
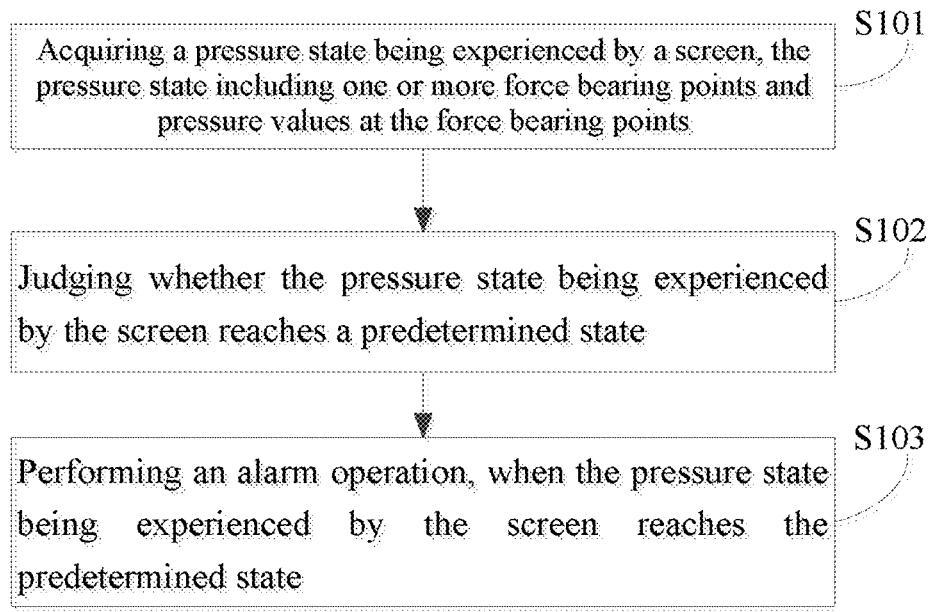
FIG. 1 is a flowchart illustrating a screen protection method according to an exemplary aspect of the present disclosure.

FIG. 1 illustrates a screen protection method according to an exemplary aspect of the present disclosure, which may be applied in a device equipped with a screen. The screen may be a touch screen or a liquid crystal screen. As illustrated in FIG. 1, the method may comprise the following steps S101 to S103.

In step S101, a pressure state being experienced by a screen is acquired, wherein the pressure state comprises one or more force bearing points and pressure values at the force bearing points.

In step S102, it is judged whether the pressure state being experienced by the screen reaches a predetermined state.

In step S103, an alarm operation is performed when the pressure state being experienced by the screen reaches the predetermined state.

The screen supports pressure detection. For example, currently, there are some screens that support pressure detection or support returning pressure parameter values.

In one aspect, the acquiring the pressure state being experienced by the screen (that is, step S101) may be acquiring a value of a pressure being borne by at least one force bearing point. There may be arranged at least one pressure detection point on the screen. When a pressure at the position of a pressure detection point is not zero, the position corresponding to the pressure detection point is a force bearing point. The force bearing point may be located at the center, the edge, or any other position on the screen.

With the above method according to the aspect of the present disclosure, an alarm operation may be performed according to the pressure state being experienced by the screen and a predetermined forewarning rule. This enables a user to timely know whether the screen is subjected to a pressure in the predetermined state and makes it easier for the user to timely take measures to reduce the pressure, thereby preventing the screen from cracking due to an excessive pressure borne by the screen, preventing economic loss from being caused to the user, and preventing the user's use of a smart device from being affected by the cracking of its screen.

Figure 2:
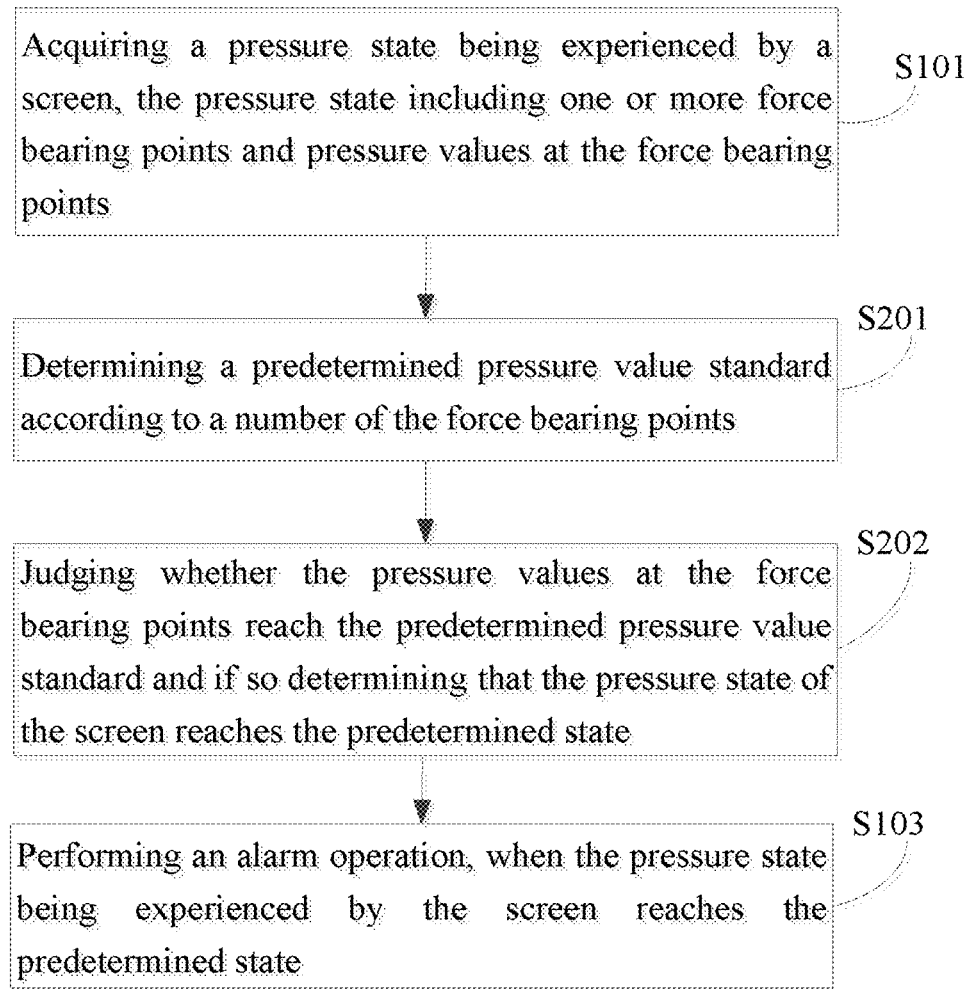
FIG. 2 is a flowchart illustrating another screen protection method according to an exemplary aspect of the present disclosure.

In one aspect, as illustrated in FIG. 2, step S102 may be implemented as steps S201 to S202.

In step S201, a predetermined pressure value standard is determined according to a number of the force bearing points.

In step S202, it is judged whether the pressure values at the force bearing points reach the predetermined pressure value standard, and if so it is judged that the predetermined state is reached. To be specific, in the aspect of the present disclosure, different predetermined pressure value standards may be defined for different numbers of the force bearing points. If a predetermined pressure value standard is satisfied, it indicates that the predetermined state is reached.

Besides, in addition to the number of the force bearing points and the pressure values at the force bearing points, the pressure state being experienced by the screen may further comprise a distance between force bearing points, or may further comprise a force bearing duration of a force bearing point. Hereinafter, different implementations of step S201 will be described respectively with respect to different pressure states.

Implementation 1

When the pressure state comprises the number of the force bearing points and the pressure values at the force bearing points, if the number of the force bearing points is one, step 201 may be implemented as: determining the predetermined pressure value standard as a first substandard when the number of the force bearing points is one.

The first substandard relates to a predetermined value of a pressure which a force bearing point is capable of bearing at most.

In one aspect, the force bearing point may be a central position of the screen. Since the central position of the screen is far away from its frame support portion, the screen is more fragile at its central position than at other positions. When the pressure value at the central position of the screen is greater than or equal to the first substandard, it may be judged that the predetermined state is reached, and then an alarm operation may be performed. As such, a user may be timely prompted, making it convenient for the user to timely take measures to reduce the pressure. This prevents the screen from cracking due to an excessive pressure borne by the screen, prevents economic loss from being caused to the user, and prevents the user's use of a smart device from being affected by the cracking of its screen. Of course, the force bearing point may also be any other position on the screen.

In one aspect, the first substandard may be: the pressure value at the force bearing point being equal to or greater than a first predetermined pressure value. The first predetermined pressure value may be a predetermined numerical value, which is set by the user himself/herself or by the system for example. Preferably, the first predetermined pressure value may be a screen crack pressure value times a first predetermined number, wherein the first predetermined number is equal to or less than 1 and the screen crack pressure value refers to a minimum pressure value causing the screen to crack. The first predetermined number may be set by the user himself/herself or by the system. To prevent the screen from being pressed to crack and to perform an alarm operation at a suitable time, the first predetermined number may be set to be greater than or equal to 0.2 and less than 1, for example, 0.6, 0.7, 0.8, and 0.9.

Implementation 2

When the pressure state comprises the number of the force bearing points and the pressure values at the force bearing points, if the number of the force bearing points is greater than or equal to 4, step 201 may be implemented as: determining the predetermined pressure value standard as a second substandard when the number of the force bearing points is greater than or equal to 4.

The second substandard relates to a predetermined value of a pressure which at least one or each of the at least four force bearing points is capable of bearing at most. In one aspect, the second substandard comprises: a pressure value at at least one of the force bearing points being greater than or equal to the first predetermined pressure value; or each of pressure values at the at least four force bearing points being greater than or equal to a second predetermined pressure value.

In one aspect, the at least one of the force bearing point may be a central position of the screen. Since the central position of the screen is far away from its frame support portion, the screen is more fragile at its central position than at other positions. When the pressure value at the central position of the screen is greater than or equal to the first predetermined pressure value, it may be judged that the predetermined state is reached, and then an alarm operation may be performed. As such, a user may be timely prompted, making it easier for the user to timely take measures to reduce the pressure. This prevents the screen from cracking due to excessive pressure borne by the screen, prevents economic loss from being caused to the user, and prevents the user's use of a smart device from being affected by the cracking of its screen. Of course, the force bearing point may also be any other position on the screen.

In one aspect, the positions of the at least four force bearing points may be at least four predetermined positions where the screen is relatively fragile, for example, four positions at the central region of the screen. The central region may be a circular region having the center of the screen as its center and a predetermined length as its radius. Any four points in the circular region are determined as the at least four force bearing points. The second predetermined pressure value is a predetermined numerical value, which may be set by the user himself/herself or by the system for example. Preferably, the second predetermined pressure value may be a predetermined value of a pressure borne by the screen when a user normally touches the screen times a second predetermined number, wherein the second predetermined number is greater than or equal to 1. The value of pressure borne by the screen when the user normally touches the screen may be acquired by performing physical measurements. The second predetermined number may be a predetermined numerical value. Preferably, to prevent the screen from cracking due to excessive pressure borne by the screen, the second predetermined number may be set as a suitable value, such that N*T2*A<T1 for example, wherein N denotes the number of the force bearing points, T2 denotes the value of the pressure borne by the screen when the user normally touches the screen, A denotes the second predetermined number, and T1 denotes the above-mentioned first predetermined pressure value. A may be equal to a value such as 2, 3, 4 or the like.

When each of the pressure values at at least four force bearing points on the screen is greater than or equal to the second predetermined pressure value, an alarm operation may be performed. As such, a user may be timely prompted, making it convenient for the user to timely take measures to reduce the pressure. This prevents the screen from cracking due to excessive pressure borne by the screen, prevents economic loss from being caused to the user, and prevents the user's use of a smart device from being affected by the cracking of its screen.

Implementation 3

When the pressure state further comprises a distance between force bearing points in addition to the number of the force bearing points and the pressure values at the force bearing points, step S201 may be implemented as: determining the predetermined pressure value standard as a third substandard when the number of the force bearing points is greater than or equal to 2 and a distance between two of the force bearing points is less than a predetermined distance.

The third substandard relates to a predetermined value of a pressure which at least one or each of the two or more force bearing points is capable of bearing at most. The third substandard may be the same as or different from the above-mentioned first substandard.

In one aspect, when the number of the force bearing points is greater than or equal to 2 and the distance between two of the force bearing points is less than the predetermined distance, it indicates that a small region on the screen is bearing a pressure. When the pressure values at the force bearing points satisfy the third substandard, an alarm operation is performed to prompt the user to take measures timely, thereby preventing the screen from cracking due to an excessive pressure borne by the screen, preventing economic loss to be caused to the user, and preventing the user's use of a smart device from being affected by the cracking of its screen.

Implementation 4

When the pressure state further comprises a force bearing duration of a force bearing point in addition to the number of the force bearing points and the pressure values at the force bearing points, step S201 may be implemented as: determining the predetermined pressure value standard as a fourth substandard when there is at least one force bearing point and a force bearing duration of the force bearing point is greater than a predetermined duration.

The fourth substandard relates to a predetermined value of a pressure which the at least one force bearing point is capable of bearing at most. The fourth substandard may be the same as or different from the second substandard.

When there are at least one force bearing point and the force bearing duration of the force bearing point is greater than the predetermined duration, it indicates that the screen is bearing a sustained pressure. When the pressure value at the force bearing point satisfies the fourth substandard, an alarm operation is performed to prompt the user to take measures timely, thereby preventing the screen from cracking due to an excessive pressure borne by the screen, preventing economic loss from being caused to the user, and preventing the user's use of a smart device from being affected by the cracking of its screen.

In any one of the above aspects, the performing the alarm operation comprises any one or more of the following operations.

One operation is highlighting a force bearing point on the screen which reaches the predetermined state, such as lighting the force bearing point reaching the predetermined state, circling the force bearing point reaching the predetermined state, or indicating the force bearing point reaching the predetermined state by any kind of marker. This enables the user to know not only the pressure condition being experienced by the screen but also which position on the screen is bearing a high pressure, making it convenient for the user to take measures to reduce the pressure.

Another operation is outputting alarm information. The alarm information may be a description of a force bearing point on the screen which reaches the predetermined state and comprise any one or both of text information and voice information. This enables the user to know not only the pressure being borne by the screen but also which position on the screen is bearing a high pressure, making it convenient for the user to take measures to reduce the pressure.

Figure 3:
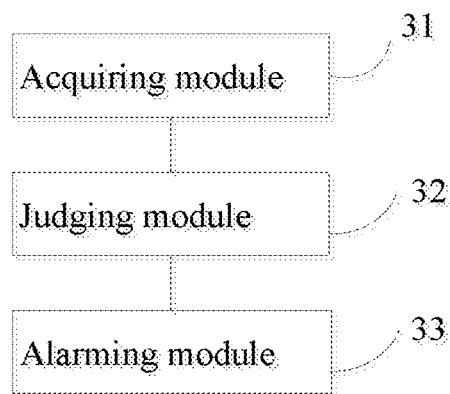
FIG. 3 is a block diagram illustrating a screen protection apparatus according to an exemplary aspect of the present disclosure.

Correspondingly to the above method according to an aspect of the present disclosure, an aspect of the present disclosure also provides a screen protection apparatus. As illustrated in FIG. 3, the apparatus comprises:

an acquiring module 31 configured to acquire a pressure state being experienced by a screen, the pressure state comprising one or more force bearing points and pressure values at the force bearing points;

a judging module 32 configured to judge whether the pressure state being experienced by the screen acquired by the acquiring module 31 reaches a predetermined state; and an alarming module 33 configured to perform an alarm operation when the judging module 32 judges that the pressure state being experienced by the screen reaches the predetermined state.

Figure 4:
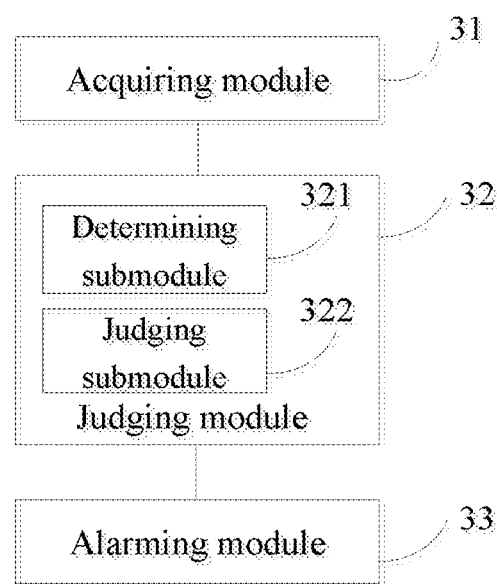
FIG. 4 is a block diagram illustrating another screen protection apparatus according to an exemplary aspect of the present disclosure.

In one aspect, as illustrated in FIG. 4, the judging module 32 comprises:

a determining submodule 321 configured to determine a predetermined pressure value standard according to a number of the force bearing points; and a judging submodule 322 configured to judge whether the pressure values at the force bearing points reach the predetermined pressure value standard determined by the determining submodule 321 and if so judge that the predetermined pressure value standard is reached.

In one aspect, the determining submodule 321 is further configured to: determine the predetermined pressure value standard as a first substandard when the number of the force bearing points is one; or determine the predetermined pressure value standard as a second substandard when the number of the force bearing points is greater than or equal to 4.

In one aspect, the first substandard comprises: the pressure value at the force bearing point being equal to or greater than a first predetermined pressure value; and the second substandard comprises: a pressure value at at least one of the force bearing points being greater than or equal to the first predetermined pressure value; or each of pressure values at the at least four force bearing points being greater than or equal to a second predetermined pressure value.

In one aspect, the pressure state further comprises a distance between force bearing points.

Correspondingly, the determining submodule 321 is further configured to: determine the predetermined pressure value standard as a third substandard when the number of the force bearing points is greater than or equal to 2 and a distance between two of the force bearing points is less than a predetermined distance.

In one aspect, the pressure state further comprises a force bearing duration of a force bearing point.

Correspondingly, the determining submodule 321 is further configured to: determine the predetermined pressure value standard as a fourth substandard when there is at least one force bearing point and a force bearing duration of the force bearing point is greater than a predetermined duration.

Figure 5:
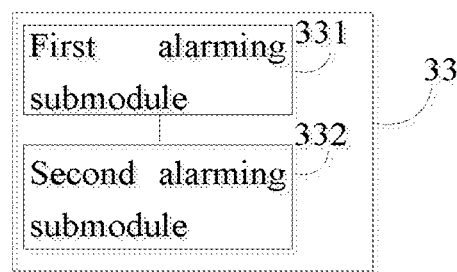
FIG. 5 is a block diagram illustrating still another screen protection apparatus according to an exemplary aspect of the present disclosure.

In one aspect, as illustrated in FIG. 5, the alarming module 33 comprises any one or more of the following submodules:

a first alarming submodule 331 configured to highlight a force bearing point on the screen which reaches the predetermined state; and/or a second alarming module 332 configured to output alarm information, the alarm information describing a position of the force bearing point on the screen which reaches the predetermined state, and the alarm information comprising text information and/or voice information.

According to a third aspect of aspects of the present disclosure, a screen protection apparatus is provided. The apparatus comprises:

a processor; and a memory for storing instructions executable by the processor, wherein the processor is configured to:

acquire a pressure state being experienced by a screen, the pressure state comprising one or more force bearing points and pressure values at the force bearing points;

judge whether the pressure state being experienced by the screen reaches a predetermined state; and perform an alarm operation when the pressure state being experienced by the screen reaches the predetermined state.

Figure 6:
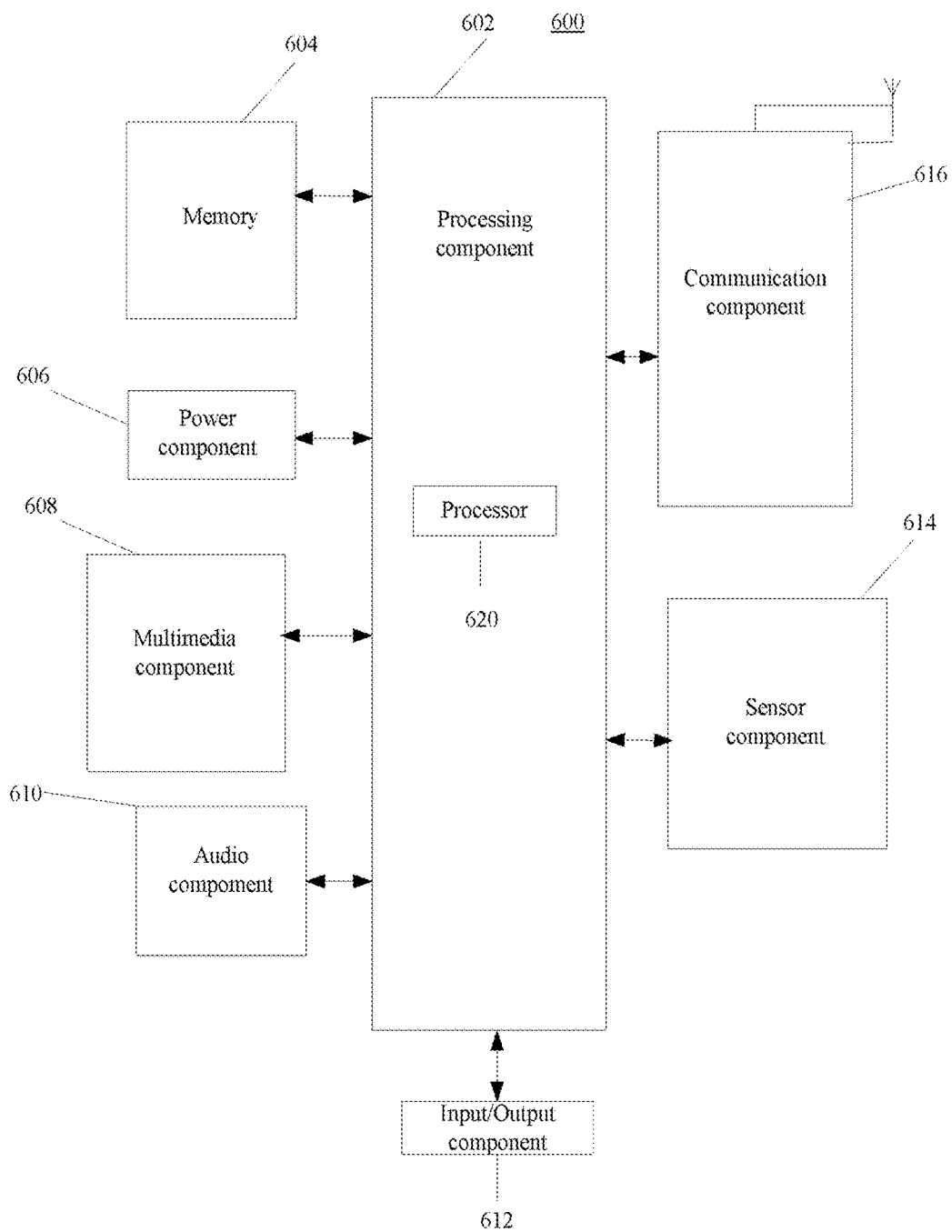
FIG. 6 is a block diagram illustrating a screen protection apparatus according to an exemplary aspect of the present disclosure.

FIG. 6 is a block diagram illustrating a screen protection apparatus 600 according to an exemplary aspect of the present disclosure, which is applicable to a terminal device. For example, the apparatus 600 may be a mobile phone, a computer, a digital broadcast terminal, a messaging device, a gaming console, a tablet, a medical device, exercise equipment, a personal digital assistant, and the like.

Referring to FIG. 6, the apparatus 600 may include one or at least two of the following components: a processing component 602, a memory 604, a power component 606, a multimedia component 608, an audio component 610, an input/output (I/O) interface 612, a sensor component 614, and a communication component 616.

The processing component 602 typically controls overall operations of the apparatus 600, such as the operations associated with display, telephone calls, data communications, camera operations, and recording operations. The processing component 602 may include one or at least two processors 620 to execute instructions to perform all or a part of the steps in the above-described methods. In addition, the processing component 602 may include one or at least two modules which facilitate the interaction between the processing component 602 and other components. For example, the processing component 602 may include a multimedia module to facilitate the interaction between the multimedia component 608 and the processing component 602.

The memory 604 is configured to store various types of data to support the operations of the apparatus 600. Examples of such data include instructions for any storage object or method operated on the apparatus 600, contact data, phonebook data, messages, pictures, videos, and the like. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the apparatus 600. The power component 606 may include a power management system, one or at least two power supplies, and other components associated with the generation, management, and distribution of power in the apparatus 600.

The multimedia component 608 includes a screen providing an output interface between the apparatus 600 and the user. In some aspects, the screen may include a liquid crystal display (LCD) and a touch panel (TP). If the screen includes the touch panel, the screen may be implemented as a touch screen to receive input signals from the user. The touch panel includes one or at least two touch sensors to sense touches, swipes, and gestures on the touch panel. The touch sensors may not only sense a boundary of a touch or swipe action, but also sense a period of time and a pressure associated with the touch or swipe action. In some aspects, the multimedia component 608 includes a front camera and/or a rear camera. The front camera and/or the rear camera may receive external multimedia data when the apparatus 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the apparatus 600 is in an operation mode, such as a call mode, a recording mode, or a voice recognition mode. The received audio signal may be further stored in the memory 604 or transmitted via the communication component 616. In some aspects, the audio component 610 further includes a speaker to output audio signals.

The I/O interface 612 provides an interface between the processing component 602 and a peripheral interface module, such as a keyboard, a click wheel, a button, or the like. The buttons may include, but are not limited to, a home button, a volume button, a starting button, and a locking button.

The sensor component 614 includes one or at least two sensors to provide status assessments of various aspects of the apparatus 600. For example, the sensor component 614 may detect an open/closed status of the apparatus 600, relative positioning of components, e.g., the display and the keypad, of the apparatus 600; and the sensor component 614 may further detect a change in position of the apparatus 600 or a component of the apparatus 600, a presence or absence of user contact with the apparatus 600, an orientation or an acceleration/deceleration of the apparatus 600, and a change in temperature of the apparatus 600. The sensor component 614 may include a proximity sensor configured to detect the presence of nearby objects without any physical contact. The sensor component 614 may also include a light sensor, such as a CMOS or CCD image sensor, for use in imaging applications. In some aspects, the sensor component 614 may also include an accelerometer sensor, a gyroscope sensor, a magnetic sensor, a pressure sensor, or a temperature sensor.

The communication component 616 is configured to facilitate communications, wired or wirelessly, between the apparatus 600 and other devices. The apparatus 600 may access a wireless network based on a communication standard, such as WiFi, 2G, or 3G, or a combination thereof. In one exemplary aspect, the communication component 616 receives a broadcast signal or broadcast associated information from an external broadcast management system via a broadcast channel. In one exemplary aspect, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 600 may be implemented with one or at least two application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary aspects, there is also provided a non-transitory computer-readable storage medium including instructions, such as included in the memory 604, executable by the processor 620 in the apparatus 600, for performing the above-described methods. For example, the non-transitory computer-readable storage medium may be a ROM, a random access memory (RAM), a compact disc read-only memory (CD-ROM), a magnetic tape, a floppy disc, an optical data storage device, or the like.

A non-transitory computer-readable storage medium including instructions, which when executed by the processor of the apparatus 600 cause the apparatus 600 to perform a screen protection method. The method comprises:

acquiring a pressure state being experienced by a screen, the pressure state including one or more force bearing points and pressure values at the force bearing points;
judging whether the pressure state being experienced by the screen reaches a predetermined state; and
performing an alarm operation when the pressure state being experienced by the screen reaches the predetermined state.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the present disclosure will be apparent to those skilled in the art from consideration of the specification and practice of the aspects disclosed herein. This application is intended to cover any variations, uses, or adaptations of the present disclosure following the general principles thereof and including such departures from the present disclosure as coming within common knowledge or customary technical means in the art. It is intended that the specification and aspects be considered as exemplary only, with a true scope and spirit of the present disclosure being indicated by the appended claims.

It will be appreciated that the present disclosure is not limited to the exact construction that has been described above and illustrated in the accompanying drawings, and that various modifications and changes can be made without departing from the scope thereof. The scope of the present disclosure is only defined by the appended claims.

What is claimed is:

1. A method for protecting a display screen, the method comprising:
    acquiring a pressure state based on external pressure that is being applied to the display screen, the pressure state including information on one or more force bearing points, a distance between the force bearing points, and pressure values at the force bearing points;
    determining whether the pressure state corresponds to a first pressure state by:
        determining a pressure value standard according to a number of the force bearing points, wherein the pressure value standard is determined as a first substandard when the number of the force bearing points is greater than or equal to 2 and a distance between two of the force bearing points is less than a predetermined distance;
        determining whether at least one of the pressure values at the force bearing points is within the pressure value standard; and
        determining that the pressure state corresponds to the first pressure state when the at least one of the pressure values is within the pressure value standard; and
    generating an alert when the pressure state corresponds to the first pressure state.

2. The method according to claim 1,
    wherein the pressure state includes a force bearing duration of a force bearing point; and
    wherein determining the pressure value standard includes determining the pressure value standard as a second substandard when there is at least one force bearing point and a force bearing duration of the force bearing point is greater than a predetermined duration.

3. The method according to claim 2, wherein generating the alert includes at least one of:
    highlighting a force bearing point on the display screen; and
    outputting alarm information identifying a position of the force bearing point on the display screen which, wherein the alarm information includes at least one of text information and voice information.

4. The method according to claim 1, wherein generating the alert includes at least one of:
    highlighting a force bearing point on the display screen; and
    outputting alarm information identifying a position of the force bearing point on the display screen, wherein the alarm information includes at least one of text information and voice information.

5. An apparatus, comprising:
    a display screen;
    a processor; and
    a memory for storing instructions executable by the processor, wherein the processor is configured to:
        acquire a pressure state based on external pressure that is being applied to the display careen, the pressure state including information on one or more force bearing points, a distance between the force bearing points, and pressure values at the force bearing points;
        determine whether the pressure state corresponds to a first pressure state by:
            determining a pressure value standard according to a number of the force bearing points, wherein the pressure value standard is determined as a first substandard when the number of the force bearing points is greater than or equal to 2 and a distance between two of the force bearing points is less than a predetermined distance;
            determining whether at least one of the pressure values at the force bearing points is within the pressure value standard; and
            determining that the pressure state corresponds to the first pressure state when the at least one of the pressure values is within the pressure value standard; and
        generate an alert when the pressure state corresponds to the first pressure state.

6. The apparatus of claim 5, wherein the pressure state further includes a force bearing duration of a force bearing point, and the processor is further configured to determine the pressure value standard as a second substandard when there is at least one force bearing point and a force bearing duration of the force bearing point is greater than a predetermined duration.

7. The apparatus of claim 5, wherein the processor is further configured to:
    highlight a force bearing point on the display screen; and
    output alarm information identifying a position of the force bearing point on the display screen, wherein the alarm information includes at least one of text information and voice information.

8. A non-transitory computer-readable storage medium having stored therein instructions that, when executed by a processor, causes the processor to perform a method, the method comprising:
    acquiring a pressure state based on external pressure that is being applied to a display screen, the pressure state including information on one or more force bearing points, a distance between the force bearing points, and pressure values at the force bearing points;
determining whether the pressure state corresponds to a first pressure state by:
  determining a pressure value standard according to a number of the force bearing points, wherein the pressure value standard is determined as a first substandard when the number of the force bearing points is greater than or equal to 2 and a distance between two of the force bearing points is less than a predetermined distance;
  determining whether at least one of the pressure values at the force bearing points is within the pressure value standard; and
  determining that the pressure state corresponds to the first pressure state when the at least one of the pressure values is within the pressure value standard; and
generating an alert when the pressure state corresponds to the first pressure state.

* * * * *